United States Patent [19]

Ovaska

[11] Patent Number: 5,352,857
[45] Date of Patent: Oct. 4, 1994

[54] PROCEDURE FOR MODERNIZING AN ELEVATOR GROUP

[76] Inventor: Seppo Ovaska, Kalervontie 2, SF-05830 Hyvinkaa, Finland

[21] Appl. No.: 913,322

[22] Filed: Jul. 15, 1992

[30] Foreign Application Priority Data

Jul. 16, 1991 [FI] Finland .............................. FI913437

[51] Int. Cl.$^5$ .............................................. B66B 1/00
[52] U.S. Cl. .................................... 187/247; 187/130
[58] Field of Search ............... 187/101, 100, 130, 139, 187/124

[56] References Cited

U.S. PATENT DOCUMENTS

| | | | |
|---|---|---|---|
| 3,703,222 | 11/1972 | Lusti et al. | 187/101 |
| 4,410,959 | 10/1983 | Tajima et al. | 187/101 |
| 4,497,391 | 2/1985 | Mendelsohn et al. | 187/121 |
| 4,622,551 | 11/1986 | Kupersmith et al. | 340/825 |
| 4,844,204 | 7/1989 | Ovaska et al. | 364/900 |
| 5,010,472 | 4/1991 | Yoneda et al. | 364/148 |

FOREIGN PATENT DOCUMENTS 2077954A 12/1981 United Kingdom .
2087598A 5/1982 United Kingdom .

OTHER PUBLICATIONS

J. W. Fortune, "Overlays", Elevator World (Sep. 1985).

Primary Examiner—R. Skudy
Assistant Examiner—R. Nappi

[57] ABSTRACT

A method for modernizing the control system of a bank of elevators, wherein in a first stage, the elevators are connected to work under elevator-specific computers controlled by a control system comprising a group controller and communicating by means of at least one serial communication bus. The connection is effected using passive adapters between the computers and the old elevator controller. For completing the modernization process of the individual elevators, the elevator-specific functions are modernized by replacing their old functions with functional modules and/or by adding functional modules performing new functions. The functional modules are connected to the elevator computer on a serial bus, one at a time, for gradually replacing the old elevator circuits connectable to a serial communication bus.

12 Claims, 7 Drawing Sheets

PROCEDURE FOR MODERNIZING AN ELEVATOR GROUP

BACKGROUND OF THE INVENTION

1. Field of the Invention

The invention relates to a procedure for modernizing the control system of an elevator group.

2. Description of Related Prior Art

Finnish Patent Publication No. 68797 (Ovaska et al) presents a procedure for modernizing an elevator group. In greatly simplified terms, the procedure presented in said publication can be described as follows: A new group control system is installed in the machine room to control the old elevator controllers, which are connected to it using adapting computers. Next, the control functions of the individual elevators in the bank are modernized one elevator at a time. For this purpose, the elevator is disconnected from the group controller, the old control functions of the elevator as well as the adapting computer are replaced with a new elevator-specific set of control equipment, whereupon the elevator is connected directly to serve under the new group controller.

An article entitled "Overlays" by J. W. Fortune (Elevator World, September 1985) describes the overlay modernization on a general level. The article also presents a concept whereby the modernization proceeds in a stepwise manner, using a modular method. However, the concept is based on a type of overlay technology that is presented e.g. in FI 68797. Therefore, the method of modernization proposed in the above mentioned article is well suited for cases where an extensive modernization job is carried out completely at the same time, but its realistic implementation in a multi-stage modular modernization project would involve a large amount of work and expenses. This is because, using conventional parallel wiring, there would generally be a considerable amount of wiring installation work and temporary connections. The article also comprises a description of a case of "conventional" overlay modernization along the principles of the solution presented in the above-mentioned patent publication FI 68797.

SUMMARY OF THE INVENTION

The object of the present invention is to provide a new method which has a great flexibility relative to the needs of the customer e.g. in respect of the composition or timetable of the modernizing project and which at the same time maintains the transport capacity of the elevator bank during the installation work performed at the site of installation, or at least enables the changes in transport capacity to be so timed that the occasional periods of lower transport capacity coincide with low-traffic periods.

The advantages achieved by modernizing an elevator group by the procedure of the invention include the following:

The procedure of the invention for modernizing an elevator group is very flexible and can therefore be customized with respect to requirements arising from different starting points. The elevator group structure produced through modernization and the inter-modular connection techniques are such that they provide a practical way to carry out the modernization in small independent modules and to install the functional modules in a substantially arbitrary order.

The modernization can be carried out in a flexible manner with respect to the operation of the elevator bank because the modernizing work proceeds step by step using functional modules, to that in the modernization of individual elevators the down time for each elevator can easily be reduced to very short working periods and timed to occur during intervals when the necessary transport capacity is low. The necessary preparations can be made without causing a large decrease of elevator group capacity relative to the transport needs and no work done outside the site of installation is needed. In practice, the progress of modernization work by the procedure of the invention can very often be so planned that no substantial fall in the level of service will occur at any stage during the work.

Grouping the functions into intelligent independent functional modules also allows the modernization project to be divided into several stages with months or years between them. Therefore, the expenses incurred by the customer because of the modernization can be distributed over a longer period of time. Thus, as smaller investments are needed at a time, the economic burden resulting from the modernization investment will be lighter. Likewise, the customer can easily choose the desired degree of modernization and have e.g. only the problematic parts of the system modernized. The nature of the functional modules is described in greater detail in connection with the descriptions of the figures illustrating the invention.

The elevator-specific functions are partly controlled by a new elevator computer, and the functions according to the old system are controlled by means of a simple adapter unit connected between the old system signals and the new elevator computer to convert the incoming and outgoing signals. Thus, only the passive adapter unit and the wiring required to connect it to the old system are temporary equipment in this type of modernization, but all the rest of the work and the rest of the new equipment are parts of the system obtained as a result of the final overall modernization.

As the signal transmission between the modernized parts in the system takes place in serial form and most of the temporary wiring required during installation is connected to the adapter unit, the solution of the invention allows obvious economies to be achieved in respect of wiring work. Also, since less wiring is required, the risk of connection errors is substantially reduced. In addition to the savings in the amount of work, further savings are obtained in the material costs. For example, in the above-mentioned method of modernizing a bank of five elevators, described in the article by J. W. Fortune, it was necessary to provide the wiring for nearly 73 elevator-specific signals (i.e 60 input signals and 13 output signals) for each elevator and about 30 group-specific signals, which means a total of nearly 400 wired parallel signals between the old and new systems. Dividing the whole modernization project into several independent partial stages would have still further increased the number of temporary wired connections. By contrast, if an elevator bank like the one described in the above example were to be modernized according to the present invention, the total number of parallel signals to be wired between the old and new systems would be, in an advantageous case, under 200, i.e. only about half of the number required before. This reduction of the total number of connections can be obtained since the functions related to the hall call and car call devices are managed from the start using elevator components designed for serial communication. Such a reduction in the amount of work means, besides reducing the risk of connection errors, considerable economies in both time and costs, especially because in complete modernization (which is the ultimate aim) the wiring between the old and new systems is a temporary solution needed only during the modernizing work and will be finally discarded.

As the system employs a local network-type serial communication bus, it is technically very flexible. Adding new functions or components to an elevator system being modernized or already modernized by this procedure is very simple. For instance, to connect an advanced lobby detector to the system, the only operation needed in addition to installing the detector itself is an update of the elevator control programs that support such a device. As a procedure, connecting a new device to the "elevator network" resembles connecting a work station to the local network of an office. Therefore, the elevator components to be connected to the system may also belong to different technological generations. It is only required that they communicate according to the protocol valid in the bus.

The technology used in intelligent serial communication networks have already reached a fairly advanced stage of development. For instance, there are several network standards designed for automobiles, e.g. A-BUS, CAN, VAN. Even if the invention does not make full use of these standards, it still allows the utilization of high-volume standard components designed to work even in difficult environmental circumstances.

Since the group control functions are connected to the system through a serial communication network, a back-up system designed to take care of the group control functions can easily be linked to the system and its engagement can be automatized if necessary. A backed-up system like this is very reliable in operation.

In the following, the application of the invention is described by means of an example by referring to the appended drawings, in which:

DETAILED DESCRIPTION OF THE INVENTION

Figure 1A:
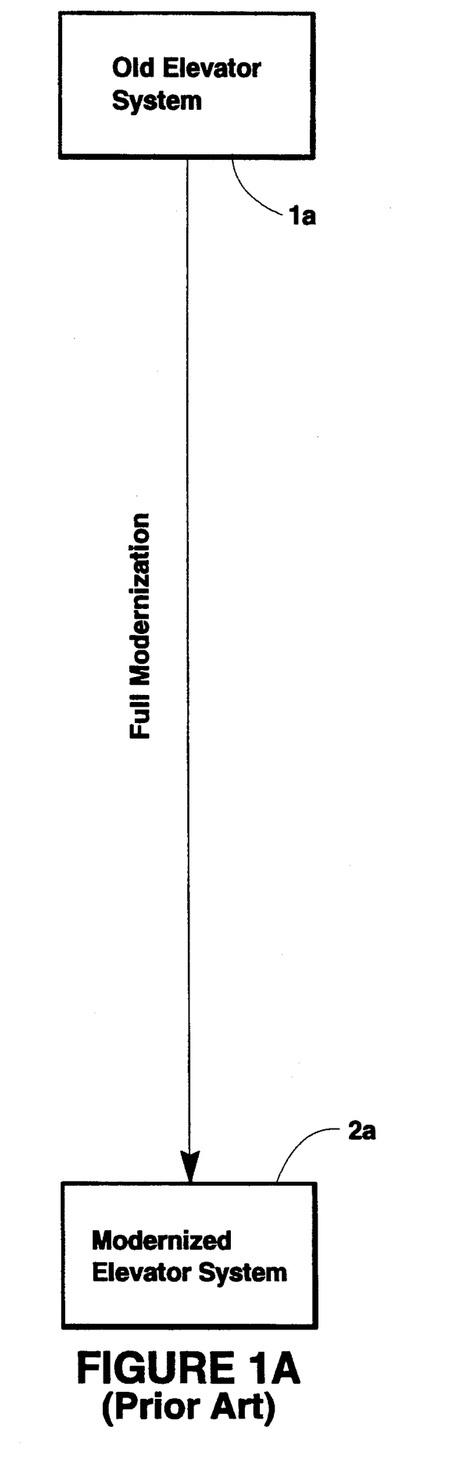
FIGS. 1A and 1B illustrate the progress of modernization in the case of previously known modernizing procedures.
Figure 1B:
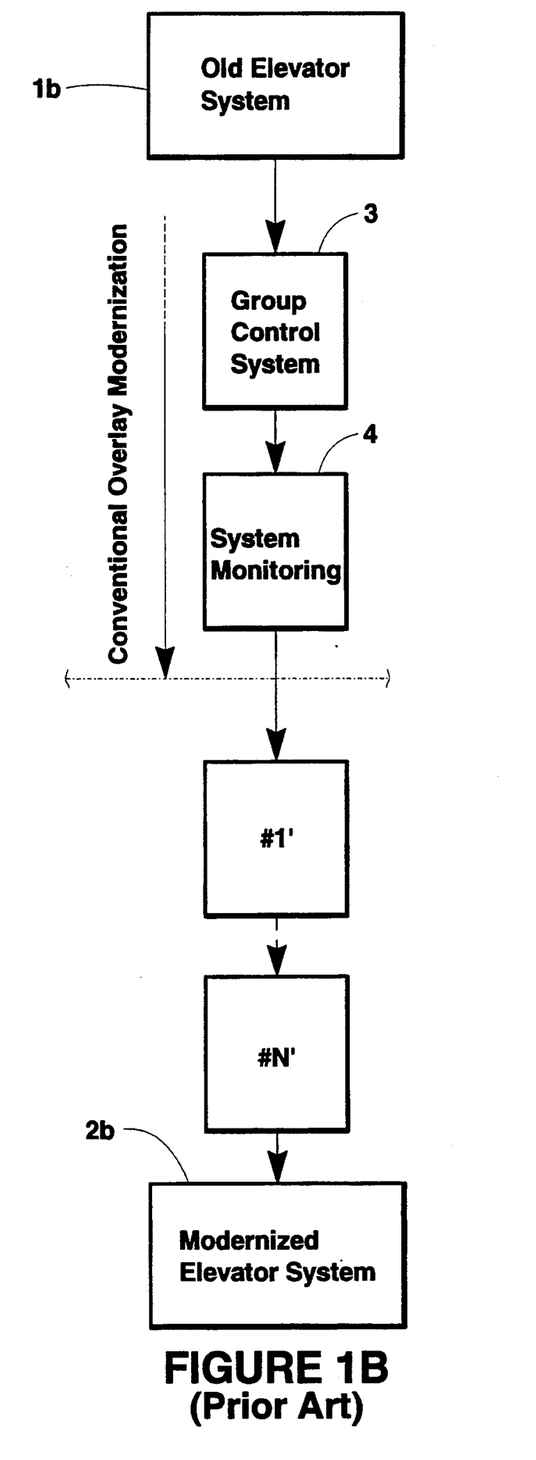
Figure 2:
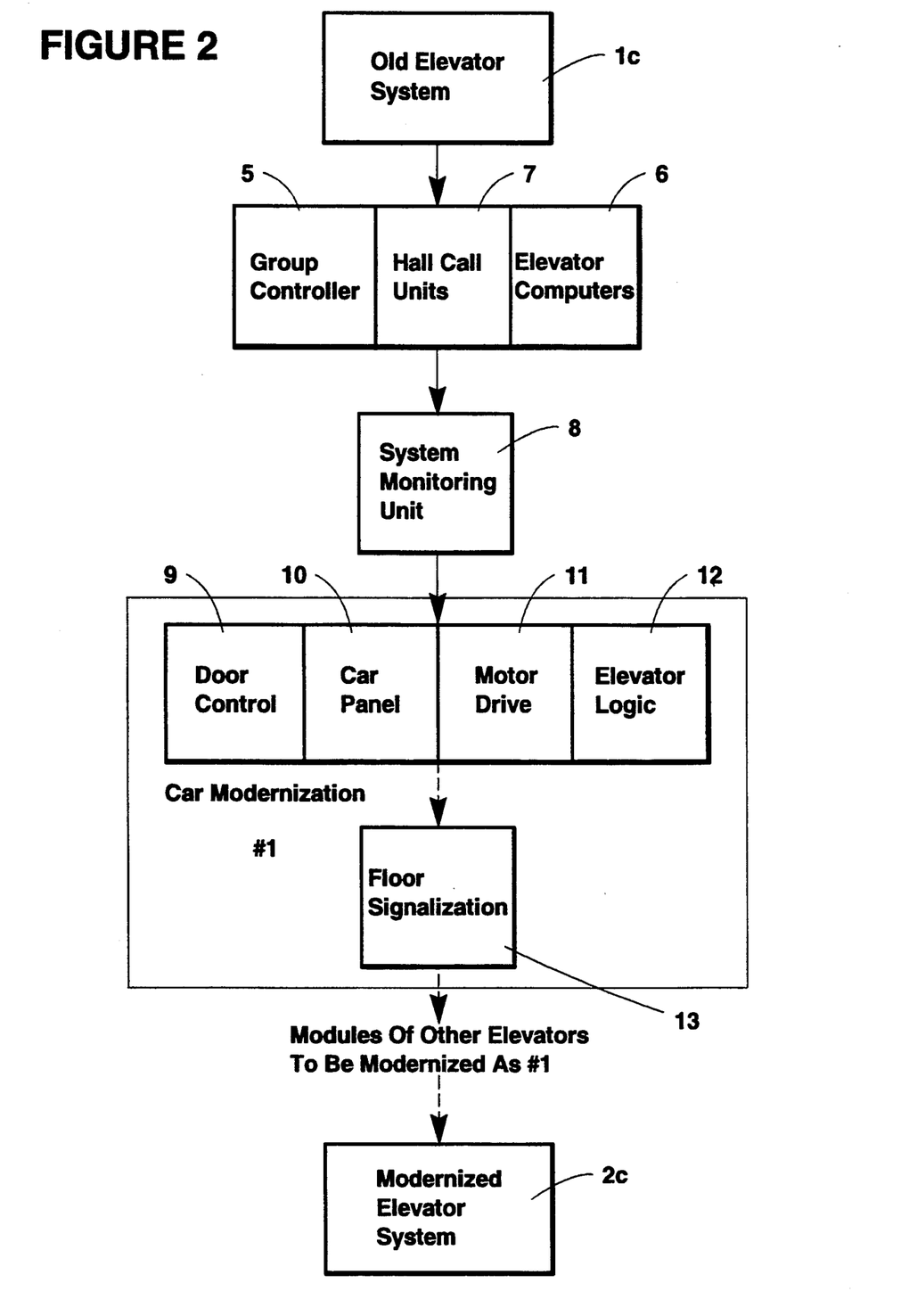
FIG. 2 illustrates the progress of modernization in the case of the modernizing procedure of the present invention.

FIGS. 1A, 1B and 2 illustrate the principles along which different modernizing methods proceed from an old elevator system 1a, 1b and 1c to a completely new elevator system 2a, 2b and 2c. FIG. 1A shows a prior-art alternative, in which the control system of the elevator group is completely modernized by directly removing the old system 1a and building a new system 2b in its place. In this alternative, some of the elevators are able to work during the modernization, but the transport capacity of the bank is significantly reduced. FIG. 2B illustrates the progress of modernization in the case of another prior-art procedure. This is a conventional modernizing procedure based on overlay modernization of the group control system as presented e.g. in Finnish Patent Publication No. 68797. In this case, the group control system 3 is renovated first and the old elevator control systems are linked to the new group control system via adapting computers. At this stage the system is also provided with a monitoring unit 4. The elevator control functions #1', ..., #N' are modernized separately for each elevator, one elevator at a time, by disconnecting the elevator from the group control system 3 and replacing the old control functions and the adapting computer with a new elevator-specific set of control equipment, whereupon the elevator is reconnected to serve under the new group control system 3.

The progress of modernization in the case of the modular modernizing procedure of the invention is illustrated in FIG. 2. In this procedure, the first step is overlay modernization of the group control system, whereby the new group control system 5 and the elevator computers operating under its control are connected to control the elevators working in accordance with the old system. The connection is performed by coupling the functions of the old system to the elevator computers 6 via simple passive I/O adapting units. At the same time, the hall call devices 7 are generally renovated to render them capable of serial communication, and a monitoring unit 8 is connected to the system. After the renovation of the parts essential to the group control functions, elevator-specific control functions #1, ... are renovated/formed one functional module 9, 10, 11, 12, 13 at a time. In principle, the procedure does not place any restrictions on the order in which the functional modules are renovated/formed. Instead, they can be renovated/formed in an order that is appropriate with respect to the progress of the work, allowing a renovated system 2c to be achieved by proceeding along various routes as desired. The elevator-specific functional modules are not limited to those mentioned; a possible additional module could be e.g. a screen placed in the elevator car for the display of information, together with the associated functions. In addition to the essential functions related to group control, the system may also comprise other group-specific functions. An example of such functions is the monitoring of the elevator lobby by means of a lobby detector, this function constituting a group-specific functional module. For example, in full modernization by the procedure of the invention, the door control function 9 and the car panel 10, which are functions associated with the elevator car, may be renovated first. The hoisting motor drives 11 are renovated next, and finally the floor signalization 13 and elevator control logic 12 functions. In principle, the procedure allows free choice of the order in which the various elevator-specific functions are renovated, but in practical work it is advisable to divide the project into distinct parts, e.g. in the manner described above.

Figure 3:
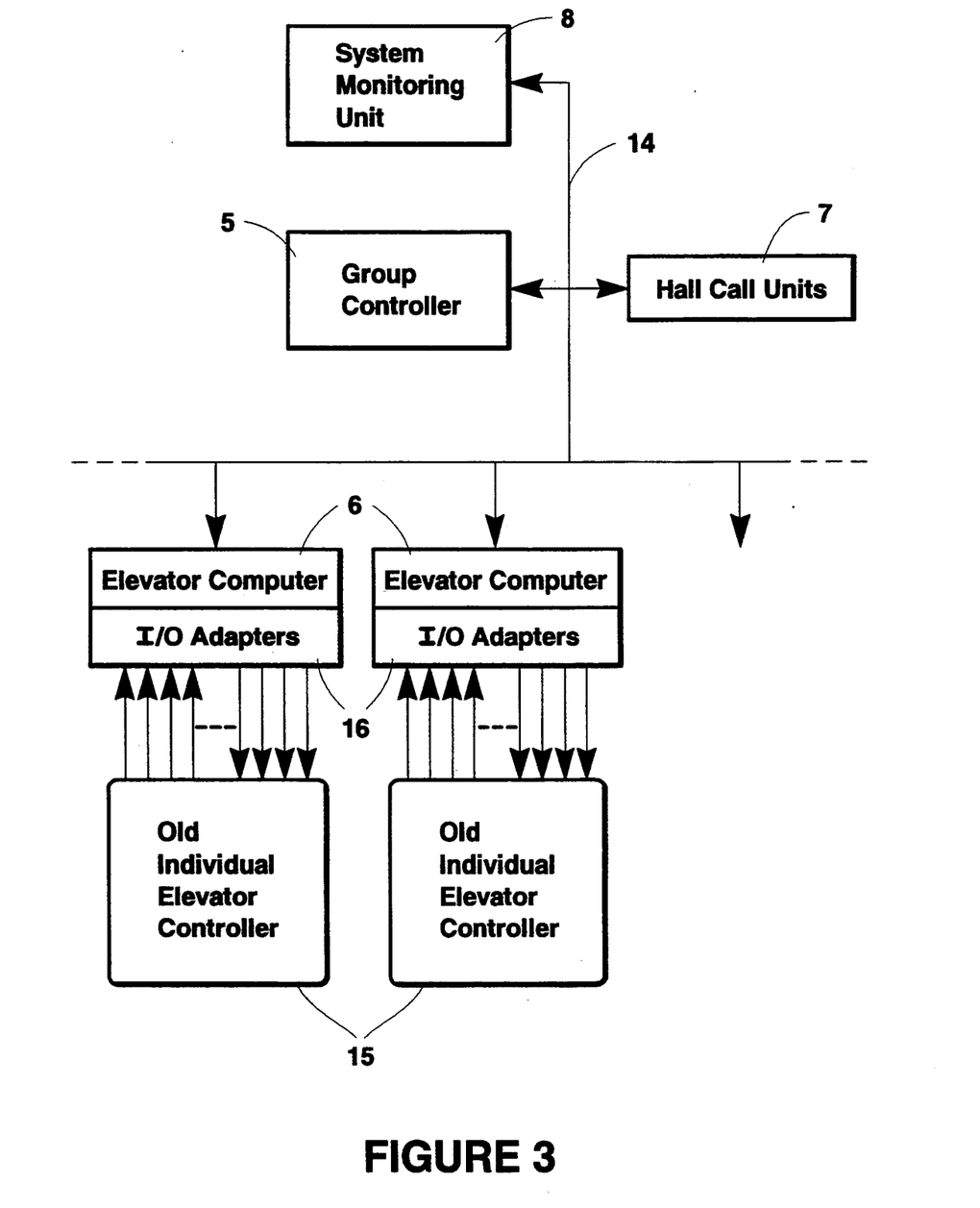
FIG. 3 represents a partially modernized elevator group control system.

FIG. 3 presents a system consisting of a group controller 5 and elevator computers 6 connected to it. The figure shows two of the elevator-specific system parts. Typically, the number of system parts is equal to the number of elevators in the bank. The system also comprises a monitoring unit 8 which is used to monitor the state of the elevator bank and by means of which its functions can be controlled. The system further comprises renovated hall call devices 7 connected via a serial communication bus 14 to the group controller 5. This system assembly, comprising the elevator computers 6 and the group control function 5 and preferably also the hall call devices 7 and a monitoring unit 8, constitutes the central part of the new control system to be installed in the elevator group at the overlay stage of the modernization. If the modernization is intended to be limited to the renovation of these central functions only, then the old individual elevator controllers 15 existing in the old system are directly linked to the elevator computers 6 of the new system by means of adapter units 16.

Figure 4:
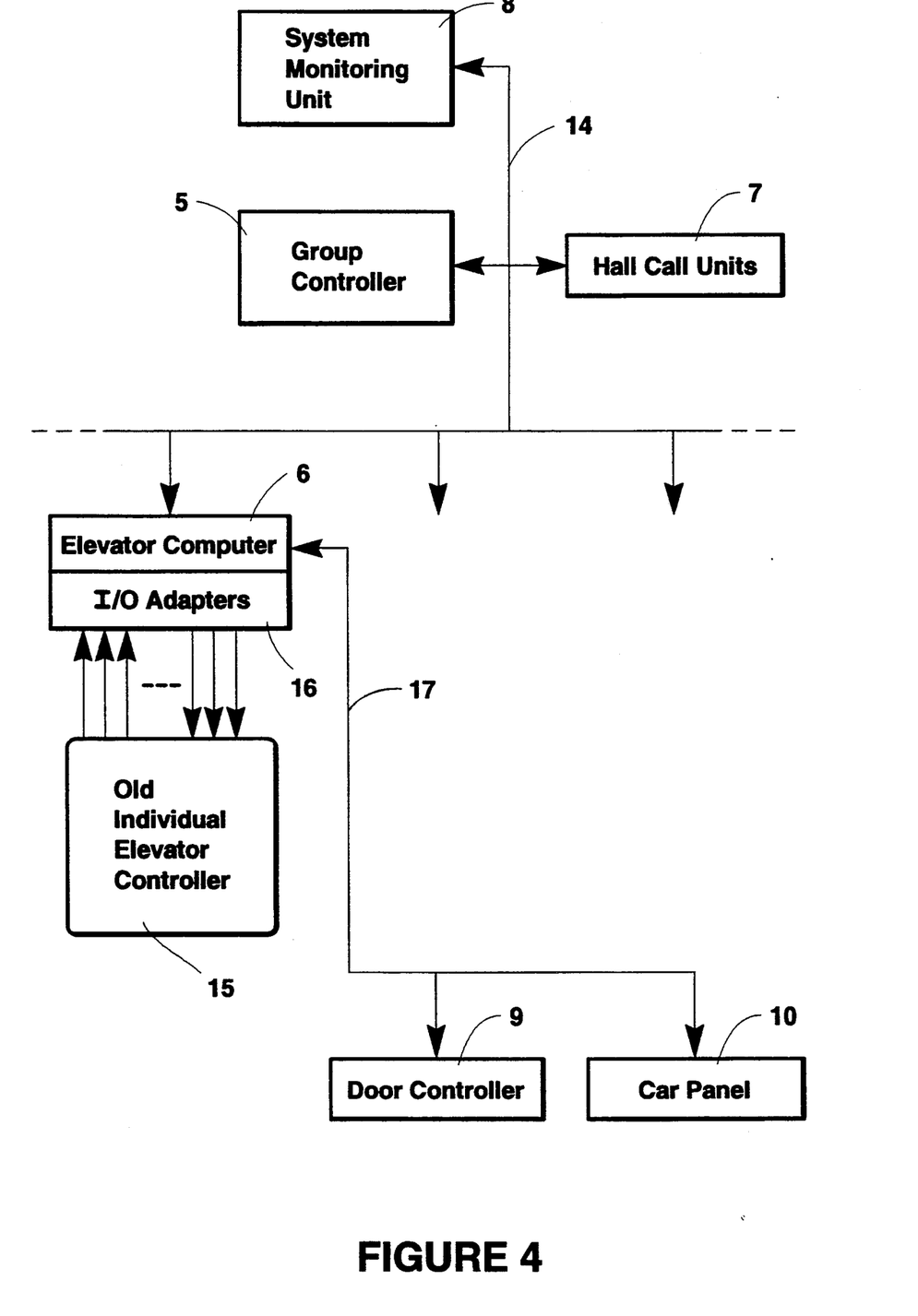
FIG. 4 represents another partially modernized elevator group control system.
Figure 5:
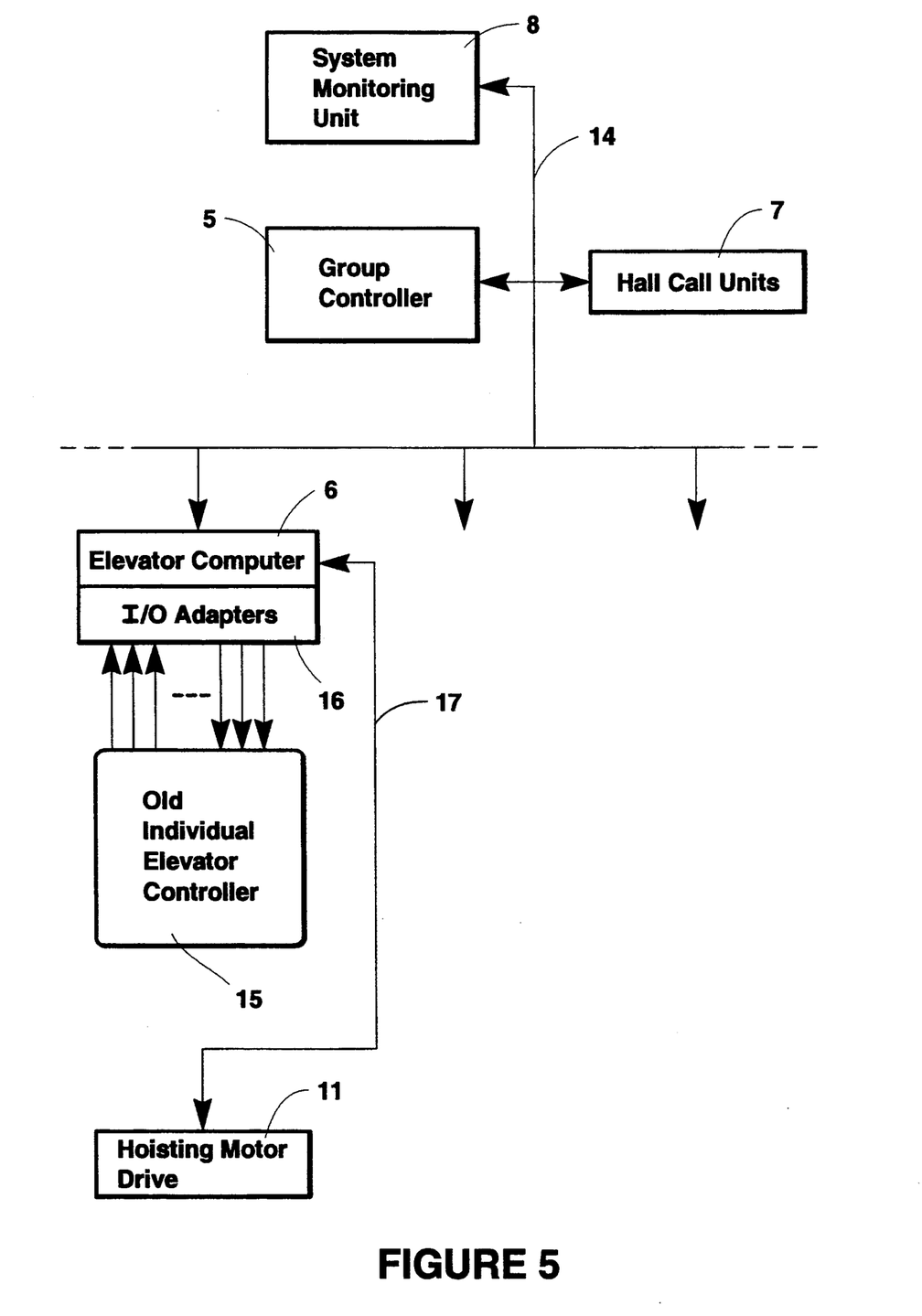
FIG. 5 represents yet another partially modernized elevator group control system.

FIGS. 4 and 5 illustrate certain alternatives of partial modernization. The renovated parts operate under control of the elevator computers 6, communicating with it via an elevator-specific data transfer bus 17. The individual elevator controller 15 is used to control the remaining old system functions and it is controlled by the new elevator computer 6 via an adapter unit 16. This remaining non-modernized functions together with the renovated parts constitute a partially modernized elevator. In the case of FIG. 4, some of the functions associated with the elevator car have been modernized by forming functional modules 9 (door controller) and 10 (car panel) and renovated related functions. In the case of FIG. 5, a functional module 11 has been formed by renovating the hoisting motor control functions.

Figure 6:
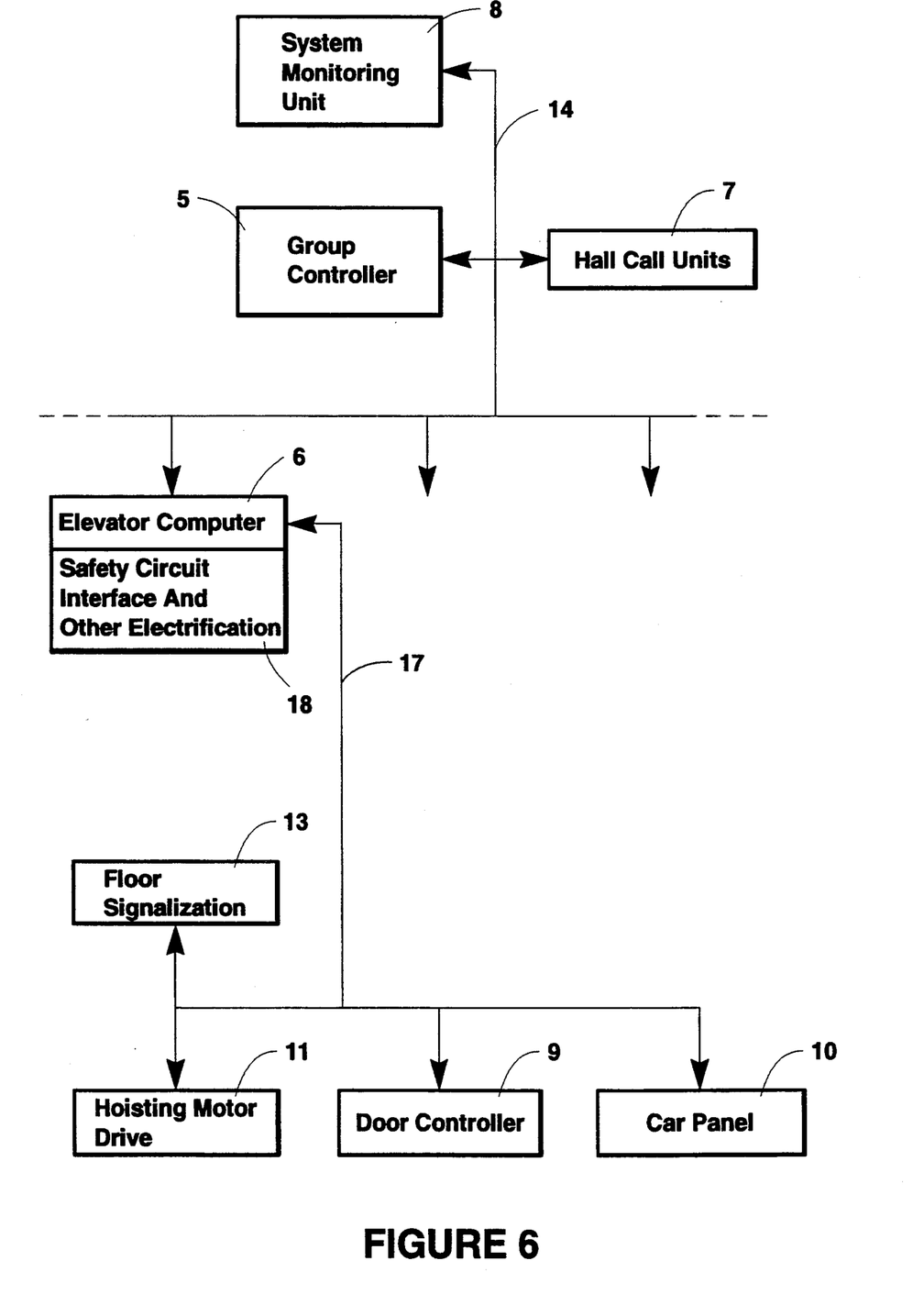
FIG. 6 represents a completely modernized elevator group control system.

FIG. 6 presents a fully modernized system. The functions of the control system of the elevator group are handled by means of elevator-specific intelligent functional modules 9, 10, 11, 12 and 13. The functional modules are formed from elevator components capable of serial communication. The elevator-specific functional modules communicate in a local network-type serial communication network 17, receiving the instructions for action from the elevator computer 6 coordinating their operation. A unit 18 containing the elevator's safety circuit interface and other electrification functions communicates with the elevator computer via a parallel interface, which during the partial modernization stages was used by the adapter unit 16 serving as a link through which the new elevator computer controlled the old elevator control system.

Figure 7:
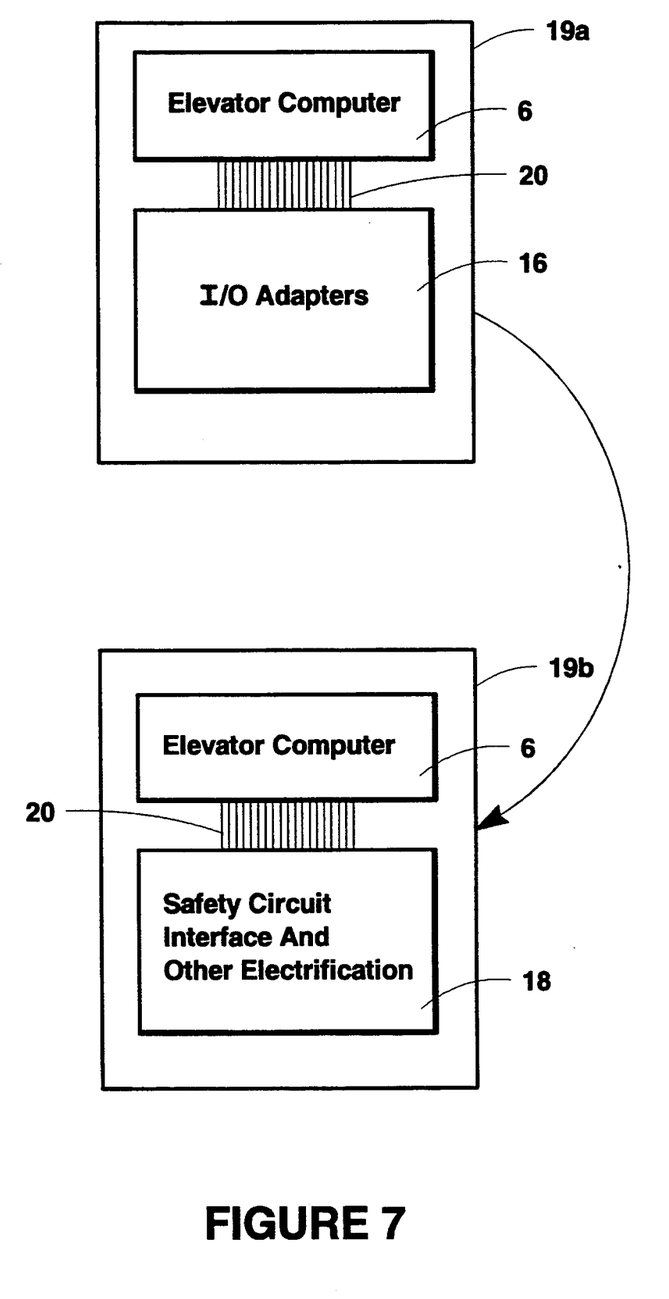
FIG. 7 represents a control panel of an elevator in a partially modernized elevator group and a corresponding completely modernized control panel, both in a simplified form.

The upper portion of FIG. 7 represents a simplified elevator control panel 19a comprising an elevator computer 6 and a passive I/O adapter unit 16. All the signals between the old individual elevator controller and the new elevator computer are connected to the I/O adapter unit 16, which acts as a converter of the old-system incoming and outgoing signals. The adapter unit is connected with a flat cable 20 to a parallel I/O port of the elevator computer. For the incoming signals, the adapter unit accomplishes galvanic decoupling, filters the signal voltages and adapts them to a level suited for the inputs of the elevator computer 6. For the outgoing signals, the adapter unit takes care of transmitting the old-system signals further as instructed by the elevator computer. Generally it also performs galvanic decoupling and voltage matching.

The lower portion of FIG. 7 represents the control panel 19b of an elevator that has reached the stage of complete modernization. In a completely modernized control system, no I/O adapter is needed between the old and new control systems. Therefore, the adapter unit has been removed from the control panel and replaced by an electromechanical connection base 18 used for the electrification of the elevator and containing a safety circuit interface. The connection base 18 includes the central electromechanical components (relays, contactors, transformers, connection blocks, switches, fuses, etc.) required by the safety circuit and other electrification of the elevator.

When the modernizing procedure of the invention is applied, the modernization of the control system of an elevator bank progresses e.g. in the manner described below.

The new control system, comprising the elevator computers for each elevator, the group control system for the elevator bank and a system monitoring unit, is installed in the machine room.

For each elevator, the elevator-specific control signals produced/required by the old control system are connected to an I/O adapter unit, which transmits and, if necessary, converts the signals between the old and new elevator systems. At this stage, also the floor signalling and hall call functions are changed to fit the new system.

The overlay stage described above, during which the central new elevator and group control functions are created and introduced, also comprises creation of the necessary conditions to allow the remaining functions associated with elevator control to be modernized a functional module at a time.

At the next stage of the modernizing process, independent functional modules operating under control of the new control system are formed. These modules may be elevator-specific, e.g. door control systems, motor drive of the elevator, car panel, or they may be group-specific, e.g. lobby detectors and certain signal devices. The old functions corresponding to the activated new functions are made inoperative.

In full modernization, all the elevator functions are ultimately under control of the new control system, so the I/O adapter unit is no longer needed. An electromechanical functional unit containing a new safety circuit interface and some other functions relating to electrification is connected in place of the adapter unit.

It is obvious to a person skilled in the art that different embodiments of the invention are not restricted to the examples described above, but that they may instead be varied within the scope of the following claims.

For instance, the group control system may be incorporated in one of the elevator control computers. The elevator control computers are connected to a serial bus and a backup group control function can easily be incorporated in any one of the other elevator control computers, or even in all of them if desired.

In the examples presented above, the system has separate serial communication networks for group control and for each elevator, but especially in small elevator banks and in low buildings where the number of devices to be connected is small, the group control signals and the elevator-specific control signals can be transmitted over a common serial communication network.

In principle, the modernization of different functions of individual elevators can be performed by modernizing the functional modules separately in an arbitrary order, but in practice it is often advisable to modernize one elevator or a given functional module, such as the functions associated with the elevator car, at a time to the planned degree of modernization.

Naturally, the subassemblies to be modernized may have mechanical or electromechanical elevator components that are not adaptable to serial communication and therefore to the modernization according to the method of the present invention, but it is preferably to renovate such components as well during modernization method of the present invention.

It is also obvious to a person skilled in the art that, although the adapter unit is used for decoupling or voltage matching in the case of majority of signals, it can be additionally used as a detector of an incoming signal, or it can generate an outgoing signal in a predefined manner upon command from the elevator computer. Further, it is obvious that certain details, such as the flat cable connection between the elevator computer and the adapter unit, are not essential to the invention but can be implemented in other ways as well.

Although the procedure of the invention proposes a course of action leading to a completely modernized elevator system, the procedure is also extremely flexible in the implementation of various partial modernizations. These include e.g.:

modernization of group control, whereby the performance and reliability of the group control system are enhanced and which comprises renovation of the call distribution algorithm and hall call devices and possibly the addition of passenger detectors to the system;

modernization of elevator cars, comprising renovation of the door controller and car call panel and eventual installation of an information screen in the car;

modernization of performance, which, in addition to group control modernization, comprises modernization of the hoisting motor drive and the door control system, whereby the travelling times and the standing times at the landings can be shortened, thus increasing the transport capacity; and modernization of hall equipment, comprising renovation of the hall call devices and the signalling system and eventual installation of information screens, whereby the functional quality of the lobby is improved and a positive influence is exerted on the impression created by it.

I claim:

1. A method for modernizing the control system of a bank of elevators, wherein each elevator is controlled by a respective elevator controller, comprising the steps of:
   (a) providing an elevator of said bank with a respective new elevator computer having a parallel communications port and at least one serial communications port, and connecting said new elevator computer to a respective elevator controller by means of a temporary adapter unit connected to said parallel communications port, whereby control of the elevator during modernization can be effected by said respective new elevator computer, at least partially through said respective elevator controller;
   (b) providing a new group controller, and connecting said new group controller and said new elevator computer to a serial communications network, whereby operation of each elevator of said bank of elevators can be effected by said new group controller, via said serial communications network and said respective new elevator computer;
   (c) connecting a monitoring unit to said serial communications network for monitoring operation of said bank of elevators;
   (d) forming a plurality of functional modules comprised of existing elevator components grouped according to the specific function performed by said components;
   (e) selecting a functional module to be modernized;
   (f) modernizing the selected functional module by:
      (f1) providing new elevator components capable of performing the same operation as corresponding old elevator components which comprise the selected functional module, each of said new elevator components being controlled by said respective new elevator computer through said serial communications network; and
      (f2) disconnecting the old elevator components which comprise the selected functional module from said respective elevator controller; and
   (g) when all operations of an elevator are being performed by new elevator components under the control of said respective new elevator computer through said serial communications network;
      (g1) providing at least one new functional unit comprising a safety system interface and elevator electrification circuits;
      (g2) removing said temporary adapter unit and said elevator controller; and
      (g3) connecting said at least one new functional unit to said respective new elevator computer through said parallel communications port of said respective new elevator computer.

2. A method for modernizing the control system of a bank of elevators, wherein each elevator is controlled by a respective elevator controller, comprising the steps of:
   (a) installing a new control system comprising a new group controller for the elevator bank, a respective new elevator computer for each elevator of said bank, and a system monitoring unit, said new group controller, respective elevator computers and said monitoring unit being connected by a serial communications network;
   (b) providing respective adapter units for adapting a plurality of control signals generated by each of said respective elevator controllers to said respective new elevator computers, whereby operation of each elevator can be controlled by said respective new elevator computers, at least partially using said respective elevator controllers;
   (c) controlling said elevator with said new group control system;
   (d) selecting a set of elevator-specific control functions, and preparing a functional module comprised of new elevator components having equivalent control functions and being capable of operative connection to said serial communications network;
   (e) discontinuing said selected set of elevator-specific control functions, and installing said functional module of new elevator components and operatively connecting said functional module to said respective new elevator computer through said serial communication network;
   (f) repeating steps (d) and (e) until all elevators in said bank of elevators has been modernized; and
   (g) when all operations of an elevator are being performed by new elevator components under the control of said respective new elevator computer through said serial communications network:
      (g1) providing at least one new functional unit comprising a safety system interface and elevator electrification circuits;

(g2) removing said temporary adapter unit and said elevator controller; and (g3) connecting said at least one new functional unit to said respective new elevator computer through said parallel communications port of said respective new elevator computer.

3. A method according to claim 1, further comprising the steps of providing new elevator components having new functions which ar not provided by any old elevator components, and connecting said new elevator components to the serial communications network so as to be controlled by said respective new elevator computer.

4. A method according to claim 2, wherein each of said respective adapter units is connected to said respective elevator computer via a parallel interface.

5. A method according to claim 1, wherein at least one new elevator component forming a group-specific functional module is connected to the new control system.

6. A method according to claim 2, wherein at least one new elevator component forming a group-specific functional module is connected to the new control system.

7. A method for modernizing the control system of a bank of elevators, wherein each elevator is controlled by a respective elevator controller, comprising the steps of:
  (a) installing a new control system comprising a new group controller for the elevator bank, a respective new elevator computer for each elevator of said bank, and a system monitoring unit, said new group controller, respective elevator computers and said monitoring unit being connected by a first serial communications network;
  (b) providing respective adapter units for adapting a plurality of control signals generated by each of said respective elevator controllers to said respective new elevator computers, whereby operation of each elevator can be controlled by said respective new elevator computers, at least partially using said respective elevator controllers;
  (c) controlling said elevator with said new group control system;
  (d) selecting a set of elevator-specific control functions, and preparing a functional module comprised of new elevator components having equivalent control functions and being capable of operative connection to a second serial communications network;
  (e) discontinuing said selected set of elevator-specific control functions, and installing said functional module of new elevator components and operatively connecting said functional module to said respective new elevator computer through said second serial communication network;
  (f) repeating steps (d) and (e) until all elevators in said bank of elevators has been modernized; and
  (g) when all operations of an elevator are being performed by new elevator components under the control of said respective new elevator computer through said second serial communications network:
    (g1) providing at least one new functional unit comprising a safety system interface and elevator electrification circuits;
    (g2) removing said temporary adapter unit and said elevator controller; and
    (g3) connecting said at least one new functional unit to said respective new elevator computer through said parallel communications port of said respective new elevator computer.

8. A method according to claim 7, wherein each of said respective adapter units is connected to said respective elevator computer via a parallel interface.

9. A method according to claim 7, wherein at least one new elevator component forming a group-specific functional module is connected to the new control system.

10. A method for modernizing the control system of a bank of elevators, wherein each elevator is controlled by a respective elevator controller, comprising the steps of:
  (a) providing an elevator of said bank with a respective new elevator computer having a parallel communications port and at least one serial communications port, and connecting said new elevator computer to a respective elevator controller by means for a temporary adapter unit connected to said parallel communications port, whereby control of the elevator during modernization can be effected by said respective new elevator computer, at least partially through said respective elevator controller;
  (b) providing a new group controller, and connecting said new group controller and said new elevator computer to a serial communications network, whereby operation of each elevator of said bank of elevators can be effected by said new group controller, via said serial communications network and said respective new elevator computer;
  (c) connecting a monitoring unit to said serial communications network for monitoring operation of said bank of elevators;
  (d) forming a plurality of functional modules comprised of existing elevator components grouped according to the specific function performed by said components;
  (e) selecting a functional module to be modernized;
  (f) modernizing the selected functional module by:
    (f1) providing new elevator components capable of performing the same operation as corresponding old elevator components which comprise the selected functional module, each of said new elevator components being controlled by said respective new elevator computer through a second serial communications network; and
    (f2) disconnecting the old elevator components which comprise the selected functional module from said respective elevator controller; and
  (g) when all operations of an elevator are being performed by new elevator components under the control of said respective new elevator computer through said second serial communications network;
    (g1) providing at least one new functional unit comprising a safety system interface and elevator electrification circuits;
    (g2) removing said temporary adapter unit and said elevator controller; and
    (g3) connecting said at least one new functional unit to said respective new elevator computer through said parallel communications port of said respective new elevator computer.

11. A method according to claim 10, further comprising the steps of providing new elevator components having new functions which are not provided by any old elevator components, and connecting said new elevator components to said second serial communications network so as to be controlled by said respective new elevator computer.

12. A method according to claim 10, wherein at least one new elevator component forming a group-specific functional module is connected to the new control system.

* * * * *

UNITED STATES PATENT AND TRADEMARK OFFICE
CERTIFICATE OF CORRECTION

PATENT NO. : 5,352,857
DATED : October 4, 1994
INVENTOR(S) : Seppo OVASKA

It is certified that error appears in the above-indentified patent and that said Letters Patent is hereby corrected as shown below:

On the title page, after item [75] please insert item [73] as follows:

--[73] Assignee: Kone Elevator GmbH, Baar, Switzerland--.

Signed and Sealed this

Thirtieth Day of January, 1996

Attest:

BRUCE LEHMAN

Attesting Officer

Commissioner of Patents and Trademarks